(12) United States Patent
Liu et al.

(10) Patent No.: US 10,884,781 B2
(45) Date of Patent: *Jan. 5, 2021

(54) METHOD AND APPARATUS FOR A VIRTUAL MACHINE

(71) Applicant: EMC IP Holding Company, LLC, Hopkinton, MA (US)

(72) Inventors: Bing Liu, Tianjin (CN); Man Lv, Beijing (CN); Eric Yang Song, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/407,572

(22) Filed: May 9, 2019

(65) Prior Publication Data

US 2019/0266005 A1 Aug. 29, 2019

Related U.S. Application Data

(63) Continuation of application No. 15/628,776, filed on Jun. 21, 2017, now Pat. No. 10,372,477.

(30) Foreign Application Priority Data

Jun. 21, 2016 (CN) .......................... 2016 1 0452126

(51) Int. Cl.
*G06F 9/455* (2018.01)
(52) U.S. Cl.
CPC ..................... *G06F 9/45558* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,438,360 B2 | 5/2013 | Youngworth | |
| 8,601,473 B1* | 12/2013 | Aron | G06F 9/5088 718/1 |
| 8,719,817 B2 | 5/2014 | Aswani et al. | |
| 8,935,695 B1* | 1/2015 | Rajaa | G06F 9/45558 718/1 |
| 8,997,097 B1* | 3/2015 | Aron | G06F 9/5061 718/1 |
| 9,052,937 B2 | 6/2015 | Yadappanavar et al. | |

(Continued)

FOREIGN PATENT DOCUMENTS

CN 102193853 9/2011

*Primary Examiner* — Isaac T Tecklu
(74) *Attorney, Agent, or Firm* — BainwoodHuang (57) ABSTRACT

Embodiments of the present disclosure provide a method and an apparatus for a virtual machine. The method implemented in a virtual machine comprises: receiving I/O requests for I/O operations on virtual disks of the virtual machine; detecting associations between the virtual disks and virtual storage devices of a virtual machine hypervisor for the virtual machine; and scheduling the I/O requests based on the associations. Embodiments of the present disclosure enable an application-aware I/O QoS in a virtual environment in an efficiently way and moving IT solutions of virtual version to different virtual platforms. The method and apparatus according to the embodiments of the present disclosure offer good flexibility and compatibility.

20 Claims, 8 Drawing Sheets

(56) References Cited

U.S. PATENT DOCUMENTS

| | | | |
|---|---|---|---|
| 9,058,123 B2* | 6/2015 | Joshi | G06F 12/0866 |
| 9,189,419 B2 | 11/2015 | Garthwaite et al. | |
| 9,262,192 B2 | 2/2016 | Gulati et al. | |
| 9,336,035 B2 | 5/2016 | Zhou et al. | |
| 9,411,623 B1* | 8/2016 | Ryan | G06F 9/45558 |
| 9,454,487 B2 | 9/2016 | Phelan et al. | |
| 9,652,265 B1* | 5/2017 | Narayanasamy | G06F 16/1748 |
| 9,665,309 B2 | 5/2017 | Franke et al. | |
| 9,672,067 B2 | 6/2017 | Lin et al. | |
| 9,766,920 B2 | 9/2017 | Klee et al. | |
| 9,817,586 B2 | 11/2017 | Liu et al. | |
| 9,983,936 B2 | 5/2018 | Dornemann et al. | |
| 10,073,656 B2 | 9/2018 | Zhe Yang et al. | |
| 2011/0125951 A1* | 5/2011 | Youngworth | G06F 3/0659 711/6 |
| 2011/0239213 A1* | 9/2011 | Aswani | G06F 9/45558 718/1 |
| 2012/0297069 A1 | 11/2012 | Duchastel et al. | |
| 2012/0324181 A1* | 12/2012 | Garthwaite | G06F 12/1081 711/159 |
| 2014/0059292 A1* | 2/2014 | Phelan | G06F 9/455 711/113 |
| 2014/0115228 A1* | 4/2014 | Zhou | G06F 9/45533 711/102 |
| 2014/0223096 A1* | 8/2014 | Zhe Yang | G06F 3/0619 711/114 |
| 2014/0245299 A1* | 8/2014 | Yadappanavar | G06F 3/0659 718/1 |
| 2015/0169341 A1* | 6/2015 | Gulati | G06F 3/067 718/1 |
| 2015/0378641 A1* | 12/2015 | Franke | G06F 3/067 710/74 |
| 2016/0147607 A1* | 5/2016 | Dornemann | G06F 3/0619 711/162 |
| 2016/0154674 A1* | 6/2016 | Lin | G06F 9/4881 718/1 |
| 2016/0359955 A1* | 12/2016 | Gill | H04L 67/10 |
| 2017/0060610 A1* | 3/2017 | Klee | G06F 3/0619 |
| 2017/0242594 A1* | 8/2017 | Liu | G06F 3/0611 |
| 2017/0329625 A1* | 11/2017 | Li | G06F 12/1009 |
| 2018/0314694 A1* | 11/2018 | Dornemann | G06F 16/2308 |

* cited by examiner

METHOD AND APPARATUS FOR A VIRTUAL MACHINE

RELATED APPLICATIONS

This application is a Continuation of U.S. patent application Ser. No. 15/628,776, filed on Jun. 21, 2017, entitled "METHOD AND APPARATUS FOR A VIRTUAL MACHINE", the contents of which is hereby incorporated herein by reference in its entirety, which claims priority from Chinese Patent Application Number CN201610452126.1, filed on Jun. 21, 2016 at the State Intellectual Property Office, China, entitled "METHOD AND APPARATUS FOR VIRTUAL MACHINE", the contents of which is also hereby incorporated herein by reference in its entirety.

FIELD

Embodiments of the present disclosure generally relate to the field of virtual machine systems, and more specifically, to a method and apparatus for a virtual machine.

BACKGROUND

Nowadays as the virtualization techniques become more and more popular, many information technology (IT) solutions on the physical platform are being moved into the virtual environment. Yet these new virtual version solutions still face many challenges. Among these challenges, Input/output (I/O) related Quality of Service (QoS) is considered as a critical problem.

Generally, the virtual environment contains I/O stacks. A virtual disk in the guest operating system is allocated from a Datastore in the Virtual Machine (VM) hypervisor. Datastore indicates a virtual storage device from a storage pool of the virtual environment. It can be a Virtual Machine File System (VMFS) file or a Network File System (NFS) file. In the context herein, the term "Datastore" may be used interchangeably to represent the virtual storage device in the hypervisor.

For the I/O QoS, different layers in the I/O stack focus on different aspects. For example, the hypervisor I/O stack schedules I/O on a VM-level, which means reserving larger I/O bandwidth for the virtual machine that has a higher priority. The backend storage device schedules I/O on a hypervisor-level, which decides the shared I/O bandwidth between different hypervisors. Moreover, within the virtual machine, I/O QoS between different processes should be managed. Such I/O scheduling may be referred to as application-aware I/O scheduling, namely, scheduling according to factors of I/O usage and/or source, etc. Presently, in the virtual environment, there is a need for an effective solution for application-aware I/O QoS.

SUMMARY

Embodiments of the present disclosure provide a method and an apparatus for a virtual machine.

According to a first aspect of the present disclosure, there is provided a method implemented in a virtual machine. The method comprises: receiving I/O requests for I/O operations on virtual disks of the virtual machine; detecting associations between the virtual disks and virtual storage devices of a virtual machine hypervisor for the virtual machine; and scheduling the I/O requests based on the associations.

In some embodiments, the receiving an I/O request for an I/O operation on a virtual disk of the virtual machine comprises: organizing the I/O requests into a first I/O request queue associated with a respective one of the virtual disks; and merging the I/O requests based on the first I/O request queue.

In some embodiments, the detecting associations between the virtual disks and virtual storage devices of a virtual machine hypervisor for the virtual machine comprises: detecting, among the virtual disks, virtual disks sharing a same virtual storage device.

In some embodiments, the scheduling the I/O requests based on the associations comprises: organizing, based on the associations, the I/O requests into a second I/O request queue associated with a respective one of the virtual storage devices; and sorting I/O requests in the second I/O request queue.

In some embodiments, the method may further comprise: converting the sorted second I/O request queue as a third I/O request queue associated with a respective one of the virtual disks; and sending the third I/O request queue to the virtual machine hypervisor, so that the virtual machine hypervisor performs I/O operations corresponding to the I/O requests in the third I/O request queue in sequence.

In some embodiments, the sorting I/O requests in the second I/O request queue comprises sorting based on at least one of the following: a feature of the second I/O request queue and a feature of the virtual disk associated with the I/O requests in the second I/O request queue.

In some embodiments, the feature of the second I/O request may comprises at least one of the following: a predetermined number of I/O requests to be processed in the second I/O request queue, an arriving time of the I/O requests in the second I/O request queue, a type of the I/O operations in the second I/O request queue, scheduling history statistics of the I/O operations in the second I/O request queue, and a priority of the I/O operations in the second I/O request queue.

In some embodiments, the feature of the virtual disk may include at least one of the following: a priority of the virtual disk, and scheduling history statistics of the virtual disk.

In some embodiments, the method may further comprise throttling the second I/O request queue.

In some embodiments, the throttling the second I/O request queue comprises: receiving a throttling threshold for the throttling from a user interface; and in response to the number of I/O requests in the second I/O request queue reaching the throttling threshold, throttling the second I/O request queue.

In some embodiments, the scheduling the I/O requests may further comprise: detecting additional associations between the virtual disks and a backend storage device; and; and scheduling the I/O requests based on the associations and the additional associations.

In some embodiments, the method may further comprise: receiving a setting related to a priority of each type of I/O operation and a priority of an I/O operation on each virtual disk from a user interface; and informing performance of each type of I/O operation and the I/O operation on each virtual disk to the user interface for a user to adjust the setting.

In some embodiments, the detection may be performed by a detecting unit and the scheduling may be performed by a scheduling unit. The method may further comprise: in response to the detecting unit detecting the associations, attaching a virtual disk being attached to a NO Operation (NOOP) I/O scheduler to the scheduling unit.

According to a second aspect of the present disclosure, there is provided an apparatus implemented in a virtual machine. The apparatus comprises at least one processor and at least one memory comprising computer program codes; wherein the at least one memory and the computer program codes are configured to, together with the processor, cause the apparatus to at least: receive I/O requests for I/O operations on virtual disks of the virtual machine; detect associations between the virtual disks and virtual storage devices for a virtual machine hypervisor for a virtual machine; and schedule the I/O requests based on the associations.

In some embodiments, the at least one memory and computer program codes can be further configured to, together with the processor, cause the apparatus to receive I/O requests for I/O operations on virtual disks of a virtual machine at least by: organizing the I/O requests into a first I/O request queue associated with a respective one of the virtual disks; and merging the I/O requests based on the first I/O request queue.

In some embodiments, the at least one memory and computer program codes may be further configured to, together with the processor, cause the apparatus to detect the associations between the virtual disks and the virtual storage devices of a hypervisor for a virtual machine by detecting, among the virtual disks, virtual disks sharing a same virtual storage device.

In some embodiments, the at least one memory and computer program codes can be further configured to, together with the processor, cause the apparatus to schedule the I/O requests based on the associations at least by: organizing, based on the associations, the I/O requests into a second I/O request queue associated with a respective one of the virtual storage devices; and sorting I/O requests in the second I/O request queue.

In some embodiments, the at least one memory and computer program codes can be further configured to, together with the processor, cause the apparatus to at least: convert the sorted second I/O request queue as a third I/O request queue associated with a respective one of the virtual disks; and send the third I/O request queue to the virtual machine hypervisor, so that the virtual machine hypervisor performs I/O operations corresponding to the I/O requests in the third I/O request queue in sequence.

In some embodiments, the at least one memory and computer program codes can be further configured to, together with the processor, cause the apparatus to sort the second I/O request queue based on at least one of the following: a feature of the second I/O request queue and a feature of the virtual disk associated with the I/O requests in the second I/O request queue.

In some embodiments, the feature of the second I/O request may comprises at least one of the following: a predetermined number of I/O requests to be processed in the second I/O request queue, an arriving time of the I/O requests in the second I/O request queue, a type of the I/O operations in the second I/O request queue, scheduling history statistics of the I/O operations in the second I/O request queue, and a priority of the I/O operations in the second I/O request queue.

In some embodiments, the feature of the virtual disk may comprise at least one of the following: a priority of the virtual disk and scheduling history statistics of the virtual disk.

In some embodiments, at least one memory and computer program codes can be further configured to, together with the processor, cause the apparatus to throttle the second I/O request queue.

In some embodiments, at least one memory and computer program codes can be further configured to, together with the processor, cause the apparatus to: receiving a throttling threshold for the throttling from a user interface; and in response to the number of I/O requests in the second I/O request queue reaching the throttling threshold, throttling the second I/O request queue.

In some embodiments, at least one memory and computer program codes can be further configured to, together with the processor, cause the apparatus to schedule the I/O requests by: detecting additional associations between the virtual disks and a backend storage device; and scheduling the I/O requests based on the associations and the additional associations.

In some embodiments, at least one memory and computer program codes can be further configured to, together with the processor, cause the apparatus to at least: receive a setting related to a priority of each type of I/O operation and a priority of an I/O operation on each virtual disk from a user interface; and inform performance of each type of I/O operation and the I/O operation on each virtual disk to the user interface for a user to adjust the setting.

In some embodiments, the detecting is performed by a detecting unit and the scheduling is performed by a scheduling unit. At least one memory and computer program codes may be further configured to, together with the processor, cause the apparatus to at least: in response to the detecting unit detecting the associations, attach a virtual disk being attached to a NOOP I/O scheduler to the scheduling unit.

According to the third aspect of the present disclosure, there is provided a computer program product which is tangibly stored on a non-volatile computer readable medium and comprises machine executable instructions, the machine executable instructions, when executed, causing the machine to perform the steps of the methods according to the first aspect.

BRIEF DESCRIPTION OF THE DRAWINGS

Through the following detailed description with reference to the accompanying drawings, the above and other objectives, features, and advantages of example embodiments of the present disclosure will become apparent. In the drawings, several example embodiments of the present disclosure will be illustrated by way of examples rather than limitation, in which.

Throughout the drawings, the same or similar reference symbols are used to indicate the same or similar elements.

DETAILED DESCRIPTION OF EMBODIMENTS

Principles and spirits of the present disclosure will now be described with reference to several example embodiments illustrated in the drawings. It should be appreciated that description of those embodiments is merely to enable those skilled in the art to better understand and implement exemplary embodiments disclosed herein and is not intended for limiting the scope disclosed herein in any manner.

Figure 1:
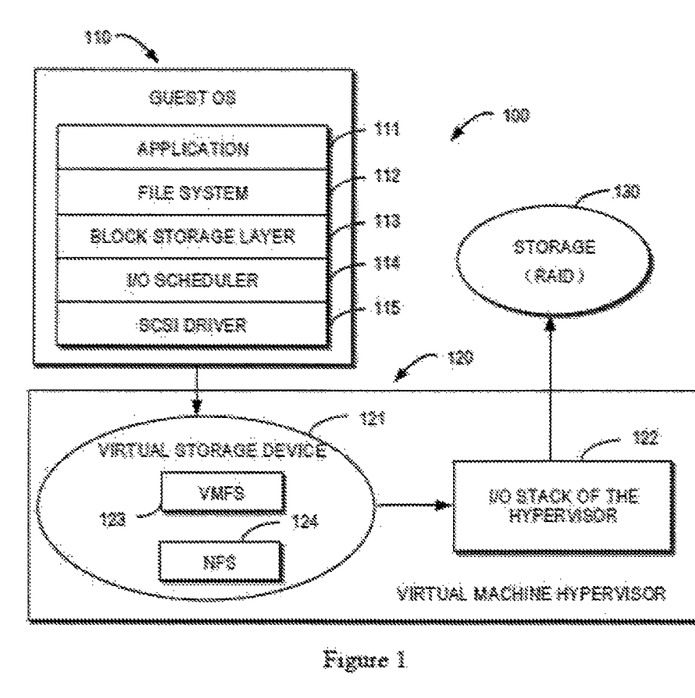
FIG. 1 illustrates a schematic diagram of a virtual environment in which the embodiments of the present disclosure may be implemented.

FIG. 1 illustrates a schematic diagram of a virtual environment 100 in which the embodiments of the present disclosure can be implemented. As shown in FIG. 1, the virtual environment 100 may include a guest Operating System (OS) 110, a hypervisor 120 and storage 130.

Further, the guest OS 110 may include an application layer 111, a file system layer 112, a block storage layer 113, an I/O scheduler 114 and a Small Computer System Interface (SCSI) driver 115. In addition, the hypervisor 120 may include a virtual storage device 121 and an I/O stack 122 of the hypervisor. The virtual storage device 121 may include a Virtual Machine File System (VMFS) 123 and a Network File System (NFS) 124. Moreover, the storage 130 can be, for instance, Redundant Arrays of Independent Disks (RAID). The functionality and normal operating manners of these specific units or components are known in the art, thus detailed description thereof will be omitted.

The I/O stack of the guest OS 110 mainly focuses on scheduling I/O requests. In application-aware I/O scheduling, namely, during scheduling based on some factors such as I/O usage and/or I/O sources, two example scheduling scenarios may exist. In one scheduling scenario, there may have some critical metadata for management applications or file systems. These metadata I/O operations may block other processes or have a great impact on the whole system performance. Thus, high priority should be provided to these types of I/O.

In the other scheduling scenario, OS related I/O is important for system performance and user experience. Compared with normal business I/O, OS related I/O requires higher priority so as to provide larger I/O bandwidth. Many existing IT solutions thus use a system disk on which only OS data is deployed to separate OS data from normal business data.

Presently, on the physical platform, some application-aware I/O QoS solutions have been provided. For example, one I/O scheduler can be employed for one physical storage disk. The I/O scheduler provides a configured weight to each type of I/O, where a larger weight indicates a higher priority in QoS. However, in the virtual environment, it is difficult for such solution to achieve sound effect because it cannot identify whether different virtual disks come from the same virtual storage device.

Figure 2:
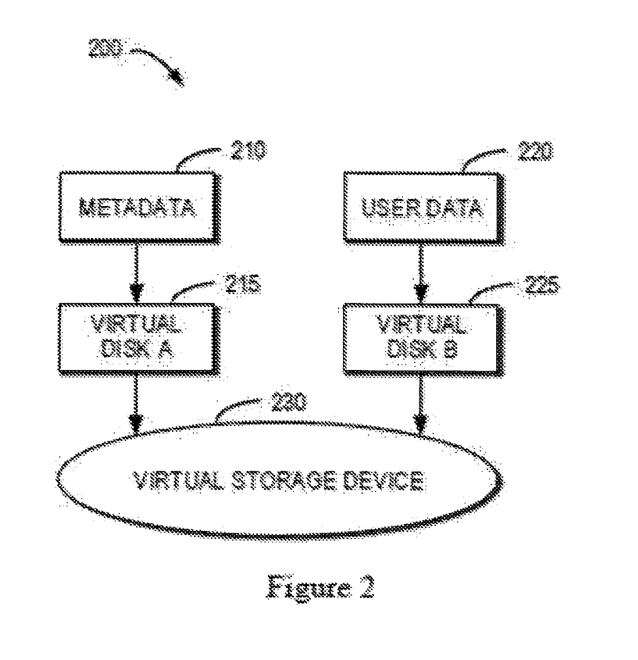
FIG. 2 illustrates a schematic diagram of a scenario where different virtual disks share the same virtual storage device.

FIG. 2 illustrates a diagram of a scenario 200 in which different virtual disks share the same virtual storage device (also referred to as Datastore). As shown in FIG. 2, an I/O operation on metadata 210 may be required to be performed with the virtual disk A 215, while an I/O operation on the user data 220 may be required to be performed with the virtual disk B 225. In the exemplary scenario of FIG. 2, the virtual disk A 215 and virtual disk B 225 share the same Datastore 230.

Assuming that the user wishes to schedule metadata 210 with a high priority, the above conventional solution may work well in this case within the storage disk A 215. However, when the metadata 210 are mixed with the user data 220 from the storage disk B 225 that shares the same Datastore 230, the high priority for metadata 210 would be pointless.

Therefore, without the information about the hypervisor 120 and the underlying storage, I/O QoS in the virtual environment can hardly be achieved. When this happens, it may lead to performance deterioration of the virtual system and may cause system breakdown.

As generally it may be not the case that each user deploys the virtual disks on different Datastores, this problem is inevitable in the actual production environment. As a matter of fact, even different virtual disks are deployed on different Datastores, experienced users still need to be very cautious to prevent the Datastores come from the same backend storage. On the whole, the above problem is common and often leads to unexpected results.

There are some existing solutions to address the above problem but these solutions have their own respective defects. One method is to employ a NOOP (an abbreviation for No Operation) I/O scheduler for the guest OS, which means no operation for the I/O scheduling in the guest OS, because it is considered to be preferable for the hypervisor I/O scheduler to complete the task. However, since the hypervisor possesses very little information about the processes in the guest OS, it cannot work for application-aware I/O QoS. Another method is to recommend the user to deploy different virtual disks manually on different Datastores. However, this method relies on user's experience and efforts. It also lacks flexibility and intelligence for the solution.

Additionally, with regard to the problem, some virtual machine platforms are configured with relevant parameters. Without such parameters, all the virtual disks share a single I/O request queue. However, these parameters enable each virtual disk to have its own request queue and to be scheduled as expected. This method works well under some conditions, but it also has own limitations. First, this method can only be supported by VMFS but not by NFS storage. Secondly, this method is supported only by some virtual machine platforms while not by other virtual machine platforms. Thirdly, this method does not make use of I/O type information from the application and thus cannot perform the I/O scheduling based on I/O type.

Returning to refer to FIG. 1, with regard to the above defects or disadvantages of the various conventional approaches, embodiments of the present disclosure address these issues by providing an application-aware I/O scheduling method and apparatus implemented in a virtual machine. Embodiments of the present disclosure may be, for instance, implemented in the guest OS 110.

Particularly, the information about which virtual disks share the virtual storage device 121 in the hypervisor 120 may be detected and reported to the I/O scheduler 114 in the guest OS 110. Then, the I/O scheduler 114 in the guest OS 110 may schedule I/Os of different virtual disks from the perspective of a virtual storage device 121 or a backend storage device 130. In this way, problems of the various conventional approaches can be eliminated.

Furthermore, two types of I/O scheduling policies can be supported. One is based on I/O type, and the other is based on virtual disk queue. Both of these two types of scheduling policies are useful for the production environment. Embodiments of the present disclosure enable application-aware I/O QoS in a virtual environment. More importantly, it can help move IT solution of the virtual version to different virtual platforms, which shows good flexibility and compatibility. A method implemented in a virtual machine according to embodiments of the present disclosure will be described in the following with reference to FIGS. 3 and 4.

Figure 3:
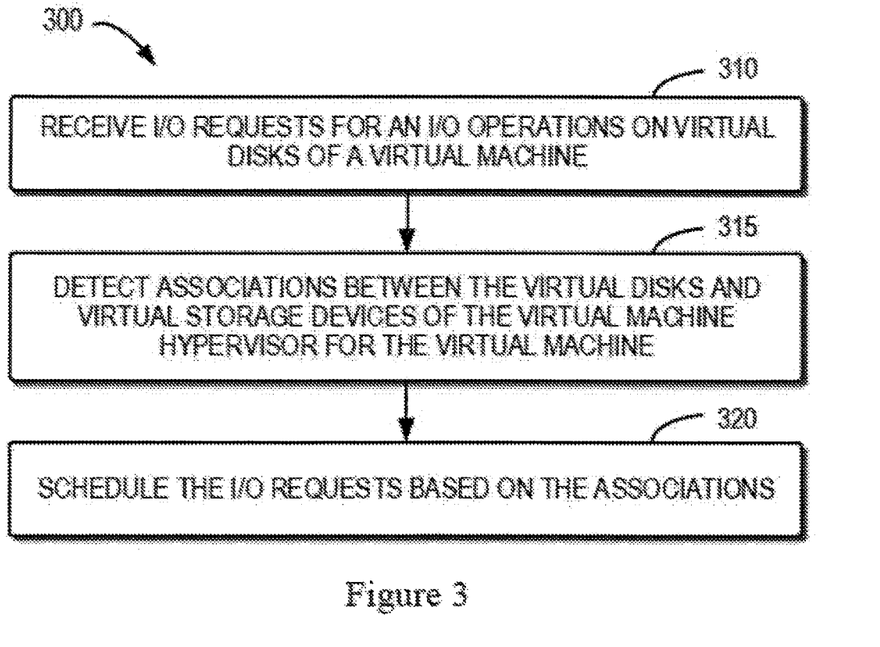
FIG. 3 demonstrates a flowchart of a method implemented in the virtual machine according to embodiments of the present disclosure.
Figure 4:
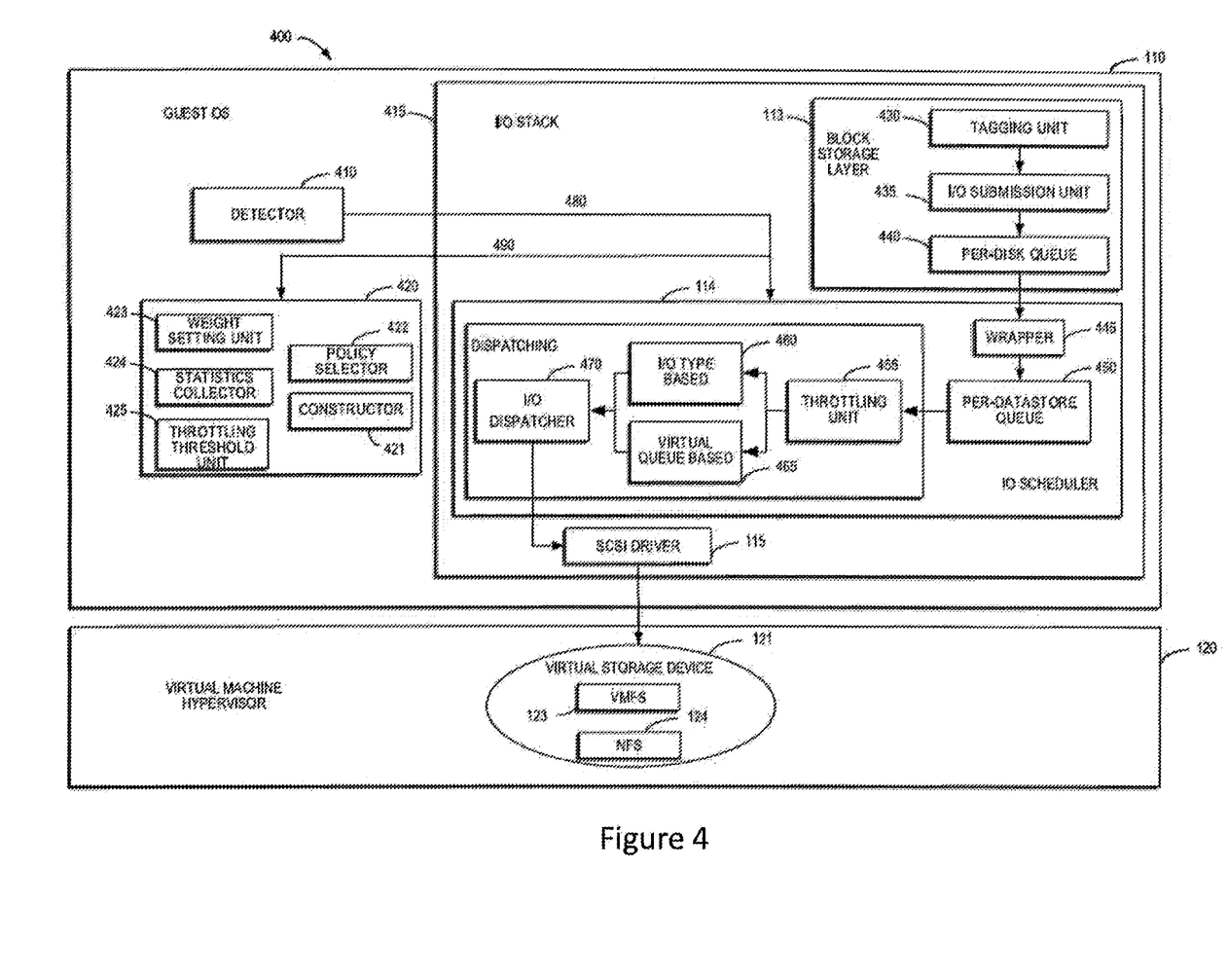
FIG. 4 illustrates a system block diagram of an application-aware I/O scheduling in a virtual environment according to the embodiments of the present disclosure.

FIG. 3 illustrates a flowchart of a method 300 implemented in the virtual machine according to embodiments of the present disclosure. In some embodiments, method 300 may be performed by some units or components in the guest OS 110 depicted in FIG. 1, which are specifically described in FIG. 4. FIG. 4 illustrates a block diagram of system 400 of an application-aware I/O scheduling in a virtual environment according to an embodiment of the present disclosure. In some embodiments, the system 400 depicts a system in which method 300 of FIG. 3 can be implemented and specifically illustrates units or components to implement the steps of method 300. It should be noted that FIG. 4 only illustrates an example, with no intention to limit embodiments of the present disclosure in any manner. To better describe the operating principle of the present disclosure, method 300 in FIG. 3 is described with reference to FIG. 4 in the following.

As shown in FIG. 4, system 400 may include a guest OS 110 and a hypervisor 120. The guest OS 110 may include a detector 410, an I/O stack 415 and a setting unit 420. As mentioned in the above, the hypervisor 120 may include a virtual storage device 121 which further includes VMFS 123 and NFS 124. The I/O stack 415 may include a block storage layer 113, an I/O scheduler 114 and a SCSI driver 115. The setting unit 420 may include a constructor 421, a policy selector 422, a weight setting unit 423, a statistics collector 424, and a throttling threshold unit 425. The block storage layer 113 may include a tagging unit 430, a submitting I/O unit 435, and a per-disk queue forming unit 440. The I/O scheduler 114 may include a wrapper 445, a per-Datastore queue forming unit 450, a throttling unit 455, a I/O type based policy scheduling unit 460, a disk queue based scheduling unit 465, and an I/O dispatcher 470. The operating and interacting process implemented by each unit or component in system 400 will be described in detail with reference to the method steps of FIG. 3 in the following.

The method 300 shown in FIG. 3 starts at 310 in which an I/O request for I/O operation on a virtual disk of the virtual machine is received. For example, in FIG. 4, the block storage layer 113 may receive I/O requests from higher application layer 111 and/or the file system 112. The I/O requests can be I/O requests for I/O operations on virtual disks (not shown) running the virtual machine of the guest OS 110.

In some embodiments, I/O requests may be organized as an I/O request queue associated with the corresponding virtual disk, which is referred to as "a first I/O request queue" for ease of discussion hereafter For example, according to the incoming I/O requests, the per-disk queue forming unit 440 in the block storage layer 113 may organize the I/O requests for the virtual disk into the corresponding I/O request queue of the virtual disk, such as the I/O request queue for virtual disk A, the I/O request queue for virtual disk B, the I/O request queue for virtual disk C and so on.

In such embodiments, I/O requests may be merged based on the first I/O request queue. It will be appreciated that I/O requests generally correspond to the virtual disks of the virtual machine. Therefore, during the process of receiving these I/O requests, it is convenient to organize them into the first I/O request queue associated with the corresponding virtual disk, which facilitates I/O merging to improve I/O performance in the virtual environment.

In some embodiments, I/O merging may be done in the first I/O request queue. Specifically, the neighboring I/O sectors may be merged which makes the size of I/O request larger. Therefore, I/O merging is very useful for improving I/O performance in the virtual environment. However, I/O merging is only meaningful for the first I/O request queue and it is otherwise not for the second I/O request queue of each storage device 121, as will be described below. As a matter of course, it is to be understood that the merging of I/O requests may not occur. Alternatively, the received I/O requests may be processed directly without being merged.

Additionally or alternatively, at 310, the block storage layer 113 may tag each incoming I/O request through the tagging unit 430. The tag may indicate the type of the I/O operation corresponding to the I/O request, so that other units or components may implement I/O type based scheduling for the I/O request, as will be described in detail later. In some embodiments, the specific I/O type may match the implementation of the upper layer. Specifically, the block storage layer 113 and the file system 112 may work together to identify the type of I/O operation corresponding to each I/O request, and then the tagging unit 430 may add the type tag to the I/O request. Afterwards, the I/O submitting unit 435 may send I/O requests tagged with type to the per-disk queue forming unit 440 to obtain I/O request queue of each virtual disk, namely, the first I/O request queue.

Returning to refer to FIG. 3, at 315, the associations between the virtual disks and the virtual storage devices of the hypervisor for the virtual machine is detected. For example, in FIG. 4, the associations between the virtual disk running the virtual machine of the guest OS 110 and the virtual storage device 121 can be detected with the detector 410.

In some embodiments, the detector 410 in the guest OS 110 may be running as a user space daemon. The detector 410 may collect information about the virtual storage device 121 by calling an Application Program Interface (API) provided by the hypervisor 120. In other embodiments, it is also possible to develop a target on the hypervisor 120 to collect more desired information so that the detector 410 can obtain such information by communicating with this target.

After detecting the associations between the virtual disks and the virtual storage device 121, the detector 410 may provide 480 the associations to the I/O scheduler 114, so that the I/O scheduler 114 may perform I/O scheduling based on the associations. In some embodiments, the detector 410 may detect those among the virtual disks that share the same virtual storage device, and provide 480 them to the I/O scheduler 114. By learning the associations between the virtual disks and the virtual storage devices, the I/O scheduler 114 may implement the application-aware I/O scheduling according to the embodiments of the present disclosure in the same virtual storage devices 121, namely, performing I/O scheduling based on factors such as I/O usage and/or source.

Additionally or alternatively, apart from detecting the associations between the virtual disks and the virtual storage device 121, the detector 410 may detect the additional associations between the virtual disks and the backend storage device 130, and provide 480 it to the I/O scheduler 114. Therefore, the I/O scheduler 114 may schedule the I/O requests based on the above associations and the additional associations. In this way, during the process of scheduling I/O requests, it is guaranteed that not only scheduling is performed in the same virtual storage device 121 but also in the same backend storage device 130. Hence, I/O performance in the virtual machine system may be further improved.

Still referring to FIG. 3, at 320, the I/O request is scheduled based on the associations. For example, in FIG. 4, after receiving the associations between the virtual disks of the virtual machine of the guest OS 110 and the virtual storage device 121 provided 480 by the detector 410, the I/O scheduler 114 may know which I/O requests are associated with the same virtual storage device 121, thereby performing scheduling on these I/O requests within the same virtual storage devices 121.

In some embodiments, the I/O scheduler 114 may organize the I/O requests as an I/O request queue associated with the corresponding virtual storage device 121, referred to as "the second I/O request queue", with the wrapper 445 and the per-Datastore queue forming unit 450 based on the associations. Then, the I/O requests in the second I/O request queue may be sorted.

In these embodiments, the wrapper 445 may maintain both virtual disk information and virtual storage device information of the I/O requests, and with the associations provided 480 by the detector 410, derive the virtual storage devices 121 for the I/O requests from the virtual disks corresponding to the I/O requests. The per-Datastore queue forming unit 450 may, based on the virtual storage devices 121 derived from the wrapper 445, aggregate the I/O requests from the same virtual storage device 121 to a single I/O request queue namely, an I/O request queue for each virtual storage device 121.

As stated above, different virtual disks may correspond to the same virtual storage device, however in practice it could achieve better performance to perform I/O scheduling in the same virtual storage device. The I/O requests are organized as the second I/O request queues associated with the corresponding virtual storage devices and the I/O requests are then scheduled (or sorted) in each of the second I/O request queues, thus ensuring I/O scheduling performance. It should be appreciated that organizing the I/O requests to the second I/O request queues is optional in the whole process. In an alternative embodiment, it is possible to directly schedule the received I/O requests based on the virtual storage device associated with the I/O requests without organizing them to the second I/O request queues.

Additionally or alternatively, in some embodiments, the I/O scheduler 114 may throttle the second I/O request queue with the throttling unit 455. Such throttling policy may be used to avoid overload of the underlying devices. However, for the I/O scheduler 114 according to the embodiments of the present disclosure, the throttling unit 455 may play another important role. When the throttling unit 455 throttles the second I/O request queues with a limited number of in-flight I/Os, it may be expected that I/O scheduling weight makes sense in a batch of I/O requests. This avoids mixing a plurality of batches of I/O requests in the hypervisor 120 where the I/O scheduler of the hypervisor 120 may disturb the I/O scheduling policy of the guest OS 110 heavily.

In these embodiments, the user may set a throttling threshold with a throttling threshold unit 425 in the setting unit 420. The setting unit 420 may provide 490 the throttling threshold to the I/O scheduler 114. When the number of I/O requests in a second I/O request queue reaches the throttling threshold, the throttling unit 455 may throttle the second I/O request queue. As a matter of course, throttling the second I/O request queues is optional in the whole process. In an alternative embodiment, it is possible to directly sort the second I/O request queues without throttling.

During scheduling for a second I/O request queue, the I/O request in the second I/O request queue may be sorted on the basis of various factors. For example, in an embodiment, features of the second I/O request queue which represent the property of the second I/O request queue may be considered, including but not limited to at least one of the following: a predetermined number of I/O requests to be processed in the second I/O request queue, the arriving time of the I/O requests in the second I/O request queue, the type of I/O operations in the second I/O request queue, the scheduling history statistics of I/O operations in the second I/O request queue, and the priority of I/O operations in the second I/O request queue.

For example, the I/O scheduler 114 may sort the I/O requests in the second I/O request queue with the I/O type-based policy scheduling unit 460. The I/O type-based policy herein denotes that the I/O scheduling is based on the I/O type. As described above, each I/O request may have a tag added based on its type by the tagging unit of the block storage layer 113, and each I/O type may have a weight configured by the user. In some embodiments, the weight may be configured by the user with the weight setting unit 423, as will be described later. For example, in the file system 112, different types of metadata may exist, and some of them might be critical and thus should be stored in the storage disk with higher priority. Therefore, such kind of I/O may be assigned with relatively greater weight.

Alternatively or additionally, the I/O scheduler 114 may sort the I/O request in a second I/O request queue based on the features of the virtual disks associated with the I/O requests in the second I/O request queue with a disk queue based scheduling unit 465. The examples of features of virtual disks include but are not limited to at least one of the following: the priorities of the virtual disks and the scheduling history statistics of the virtual disks.

The disk queue based policy is useful for the scenario related to the system disk mentioned in the Background. The tags given by the upper layer are not needed, which differs from the I/O type based policy. The user may configure a certain virtual disk as a system disk and then provide high priority to the I/Os on the storage disk.

In addition, it will be appreciated that the number of I/O requests scheduled in one round may be limited in a reasonable range by adjusting a predetermined number of I/O requests to be processed in the second I/O request queue or the arriving time of the I/O requests in the second I/O request queue, thereby optimizing the I/O performance of the system. For example, the I/O requests in the second I/O request queue may be scheduled on a basis of rounds. The I/O type based policy scheduling unit 460 and the disk queue based scheduling unit 465 may schedule I/O requests of a predetermined number in one scheduling round. I/O requests exceeding the predetermined number may be scheduled in the next round. In some cases, to avoid long waiting before reaching the predetermined number, it is also possible to set a reaching time window of a round and perform scheduling in this round of scheduling if the I/O requests in the second I/O request queue arrive in the time window. Otherwise, they can be scheduled in the next round.

Further, the scheduling history statistics of I/O operations in the second I/O request queue represents the condition of the I/O scheduling of the previous round. This condition may also be exploited to be used for the scheduling process. For example, if a large number of I/Os of a certain type have been scheduled in the previous round, a smaller number of this type of I/Os may be scheduled in the following round. Similarly, features of virtual disks, such as scheduling history statistics related to the virtual disk, may be applied in the scheduling process of I/O requests.

For example, the I/O type based policy scheduling unit 460 may take a weight of a certain type of I/Os and the scheduling (dispatching) history of I/Os of this type into account, and make I/O scheduling decisions on this basis. For example, for each type of I/Os, a ratio of a dispatching number and a weight may be used as its scheduling factor, and the I/O type with the minimum scheduling factor is always dispatched. This means that a higher priority and a smaller number of I/Os dispatched recently provide a greater chance for this round of scheduling.

Similarly, the disk queue based scheduling unit 465 may schedule the I/O requests based on a weight and scheduling (dispatching) history of each virtual disk. For example, compared with other virtual disks in the same virtual storage device 121, if a virtual disk is assigned with a higher priority, it has more chances to schedule I/Os so as to help to improve I/O performance of critical data. In some embodiments, it may employ a ratio between the dispatching number and the weight as its scheduling factor.

In some embodiments, the setting unit 420 of the guest OS 110 may include a policy selector 422 for the user to choose whether to use the I/O type based or the disk queue based scheduling policy. The setting unit 420 may provide 490 user's choice to the I/O scheduler 114 so that the I/O scheduler 114 can accordingly use the I/O type based policy scheduling unit 460 or the disk queue based scheduling unit 465.

In some embodiments, the setting unit 420 of the guest OS 110 may include a weight setting unit 423 for the user to set weight for the two types of scheduling policy. The user may change these weights in a running system since the user may want to try different weights for I/Os of a particular type or some virtual disk as the system disk to analyze and adjust the I/O performance of the system. For the I/O type based policy, the user may provide the weight expected for the corresponding I/O type. The specific I/O type may be matched with the implementations on the upper layer. For example, metadata of each type and common types of business data in the file system may be listed for the user. For the disk queue based policy, the user may indicate which of the virtual disks is the expected system disk and is expected to provide weight for its I/Os.

In some embodiments, the setting unit 420 of the guest OS 110 may further include a statistics collector 424. In some cases, the user may want to profile and tune the system performance in a running system. Therefore, it may be necessary to provide corresponding statistics for the user. For the I/O type based policy, I/Os of each type and their recent performance, such as throughout capacity and delay, maybe provided. For the disk queue based policy, I/O performance on the same virtual disk and other virtual disks may be provided. The user may also configure a time window for collecting statistics indicating how often the involved statistics should be updated.

In some embodiments, the setting unit 420 of the guest OS 110 may further include a constructer 421 for attaching the virtual disk running the virtual machine of the guest OS 110 to the I/O scheduler 114 if conditions are met. As stated above, different from the physical disk, the I/O scheduler 114 of the virtual disk cannot be attached during the system boot time when the virtual disk is probed, because the detector 410 does not start to operate only after the system is normally booted and only after being started, it learns which virtual disks share the same virtual storage device 121. Therefore, in the embodiments of the represent disclosure, a "two-step switching" method may be used in place of the "one-step creation" method. The virtual disk may be firstly attached to a NOOP I/O scheduler and then switched to the I/O scheduler 114 by the notification of the detector 410. Accordingly, the constructor 421 may attach the virtual disk being attached to the NOOP I/O scheduler to the I/O scheduler 114 in response to the detected associations by the detecting unit 410.

After completing sorting of the second I/O request queue with the I/O type base policy scheduling unit 460 and the disk queue base scheduling unit 465, the I/O scheduler 114 may convert the sorted second I/O request queues through the I/O dispatcher 470 into the corresponding I/O request queues associated with the corresponding virtual disks, referred to as "the third I/O request queue." In some embodiments, the I/O dispatcher 470 may obtain batches of I/Os and re-map them into the per-disk queue. The third I/O request queue then may be sent to the hypervisor, so that the hypervisor implements the I/O operations corresponding to the I/O requests in the third I/O request queue in turn. It is beneficial to reorganize the scheduled I/O requests as the third I/O request queues associated with the virtual disks for implementing the following-up I/O operations for each virtual disk. As a matter of course, it is optional to re-map the second I/O request queue in the whole process. In an alternative embodiment, it is possible to send the second I/O request queues directly to the hypervisor without re-mapping.

In some embodiments, the I/O dispatcher 470 of the I/O scheduler 114 may complete data transmission and response handling with the virtual storage device 121 in the underlying layer of the hypervisor 120 via the SCSI driver 115 in the I/O stack 415, which will be described further with reference to FIG. 5.

Figure 5:
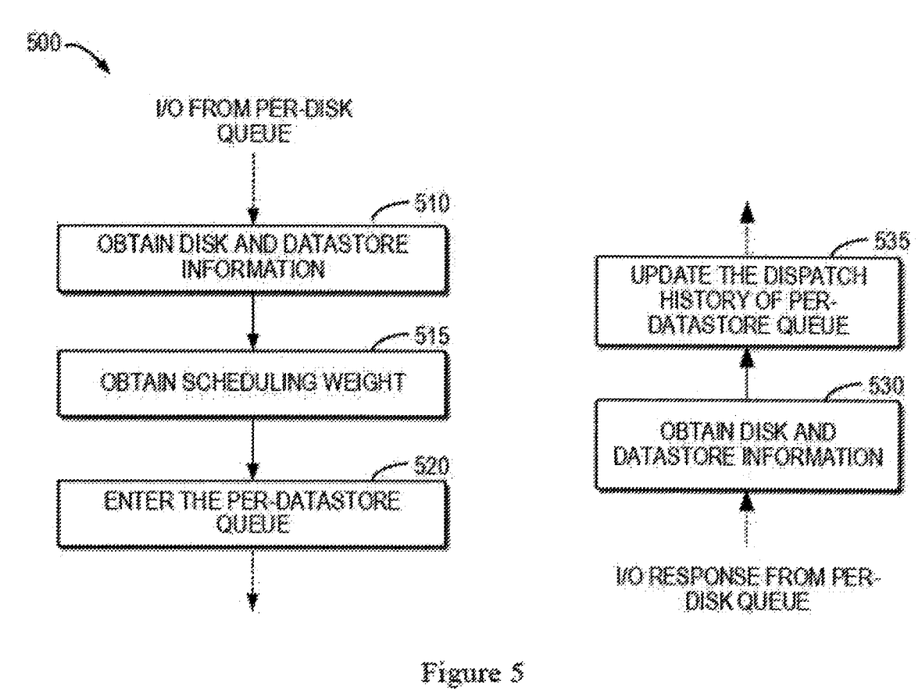
FIG. 5 demonstrates a flowchart of a handling process of incoming I/O and I/O response according to embodiments of the present disclosure.

FIG. 5 illustrates a flowchart of a handling process 500 of an incoming I/O and I/O response according to embodiments of the present disclosure. In some embodiments, the handling process of an incoming I/O during the handling process 500 may correspond to the process implemented in the wrapper 445 described above with reference to FIG. 4, and the process of processing I/O response in the handling process 500 may correspond to the process implemented in the I/O dispatcher described above with reference to FIG. 4. Therefore, the handling process 500 belongs to a part of method 300 in FIG. 3. It should be noted that FIG. 5 only describes an example, with no intention to limit the embodiments of the present disclosure.

As stated in FIG. 5, steps 510, 515 and 520 in the handling process 500 describe the handling process of an incoming I/O. The handling process of an incoming I/O, for example, starts with receiving an I/O request by the I/O scheduler from the first I/O request queue (i.e., per-disk queue) which is being used by the upper layer applications.

At 510, the virtual disk information and information of the virtual storage device for the I/O request may be obtained. At 515, depending on whether the QoS policy for the I/O request is based on I/O type or based on virtual disk queue, an I/O weight based on the corresponding policy may be obtained. At 520, the I/O request may be sent to the corresponding second I/O request queue (i.e., per-Datastore queue) with its weight.

As further shown in FIG. 5, steps 530 and 535 in the handling process 500 describe the handling process of an I/O response. The handling process of an I/O response, for example, starts when an I/O request is done and the corresponding I/O completion process is called, which may involve with each layer of the I/O stack. For the I/O scheduler 114 layer, it may receive the I/O response of the second I/O request queue.

At 530, the virtual disk information and information of the virtual storage device of the I/O response may be obtained. At 535, the I/O dispatching history of the queue of each virtual storage device may be updated. For example, if the I/O type based QoS policy is used, then a second I/O request queue for the virtual storage device with regard to the I/O request may be obtained, and then the dispatching history of this type of I/O is obtained. For example, the dispatching history may be the number of this type of I/Os that have been dispatched and returned. Therefore, the history may be updated by increasing the number. As can be known from the description of the scheduling factor, the updated history will change the scheduling factor of this type of I/Os, so that the latest scheduling factor may be applied in the I/O scheduling process of the next round.

Figure 6:
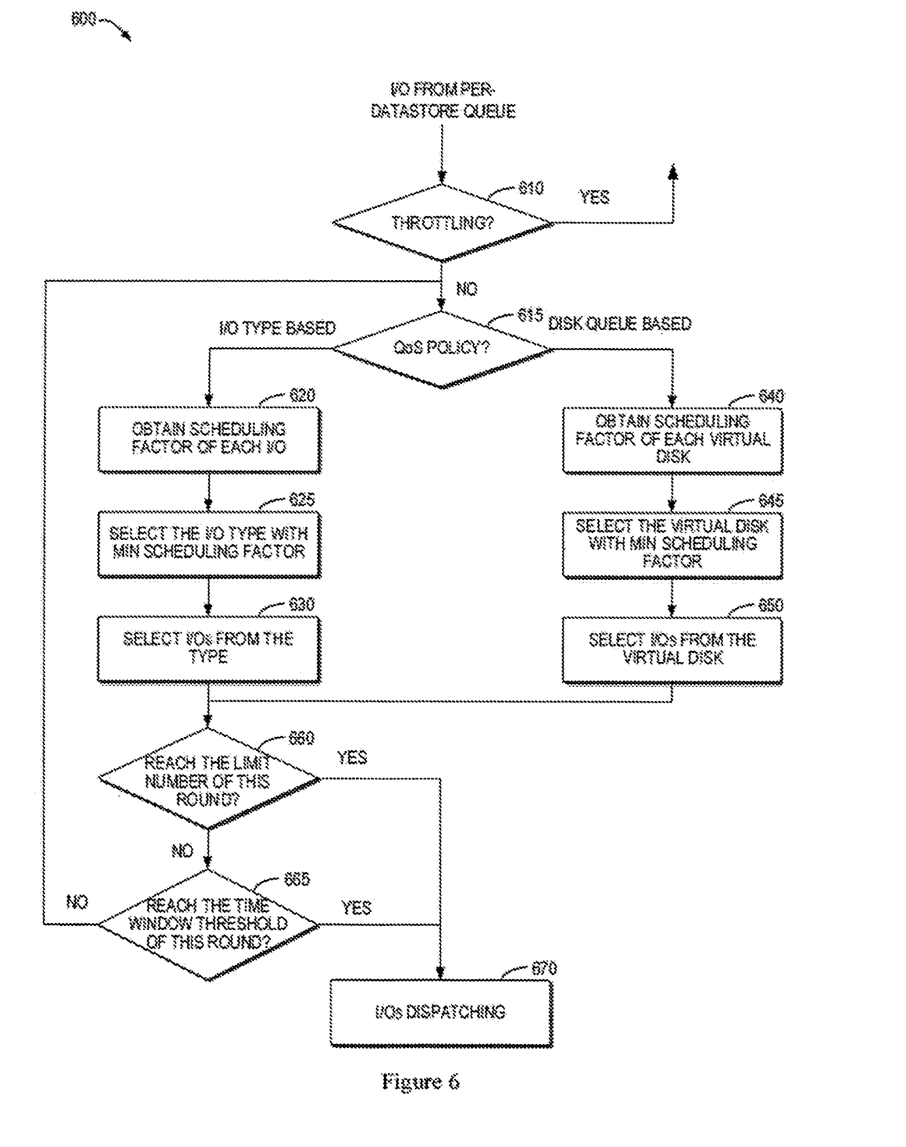
FIG. 6 demonstrates a flowchart of an internal scheduling process of the I/O scheduler according to embodiments of the present disclosure.

FIG. 6 illustrates a flowchart of an internal I/O scheduling process 600 according to embodiments of the present disclosure. In some embodiments, the scheduling process 600 may correspond to the scheduling process implemented in the I/O scheduler 114 depicted with reference to FIG. 1 and FIG. 4. Hence, the scheduling process 600 belongs to a part of method 300 in FIG. 3. It should be noted that FIG. 6 only describes an example, with no intention to limit the embodiments of the present disclosure.

As shown in FIG. 6, the scheduling process 600 may start with receiving an I/O request queue from each virtual storage device 121. For example, the upper layer (block storage layer 113) or the internal kernel thread of the I/O scheduler 114 can start the I/O request dispatching from the second I/O request queue of each virtual storage device 121.

At 610, it may be determined if it is necessary to throttle the second I/O request queue. For example, if the number of in-flight I/Os has exceeded the throttling threshold, the throttling process 600 may return. The throttling threshold can be set by the user via the user interface. If throttling is not required, the scheduling process 600 may proceed to step 615.

At 615, the QoS policy of the second I/O request queue for each virtual storage device may be detected. For example, the policy may be set by the user. If the policy to be used is I/O type based, the scheduling process 600 may proceed to step 620. If the policy to be used is disk queue based, the scheduling process 600 may proceed to step 640.

At 620, the scheduling factor of each I/O type is obtained. For example, the scheduling factor can be the history dispatching number of each I/O type divided by the weight of each I/O type. The weights can be set by the user. At 615, the I/O type with the smallest dispatching factor may be selected. At 630, the I/O requests may be fetched in batch from the selected type of queue and the number of I/O requests of this round scheduling maybe updated.

Similarly, at 640, the scheduling factor of each virtual disk may be obtained. For example, the scheduling factor can be the history dispatching number of each virtual disk divided by the weight of each virtual disk. The weights can be set by the user. At 645, a virtual disk with the smallest scheduling factor may be selected. At 650, the I/O requests may be fetched from the first I/O request queue of the selected virtual disk and the number of I/O requests of this round scheduling may be updated.

At 660, it may be detected if the number of I/O requests of this round reaches the upper limit. The upper limit of a scheduling round is set such to avoid too many in-flight I/Os. This number may be set by the user. If the upper limit is reached, the scheduling process 600 may proceed to step 670. Otherwise, it proceeds to step 665.

At 665, it may be detected if this round of scheduling reaches the time window threshold. A time window threshold for this round of scheduling is set to avoid taking too much time on one round of scheduling when the threshold of I/O request number cannot be reached. The time window threshold may be set by the user. If the time window threshold is not met, the scheduling process 600 may return to step 615 so that there is a chance to select I/O requests of other types or in the I/O request queue of other virtual disks. Otherwise, the scheduling process 600 may proceed to step 670.

At 670, one round of I/O request scheduling has been completed. Thus, this batch of I/O requests may be re-mapped to the third I/O request queue of each virtual disk by the I/O dispatcher 470, as illustrated in FIG. 4, in order to send these I/O requests to the next layer for further processing.

Figure 7:
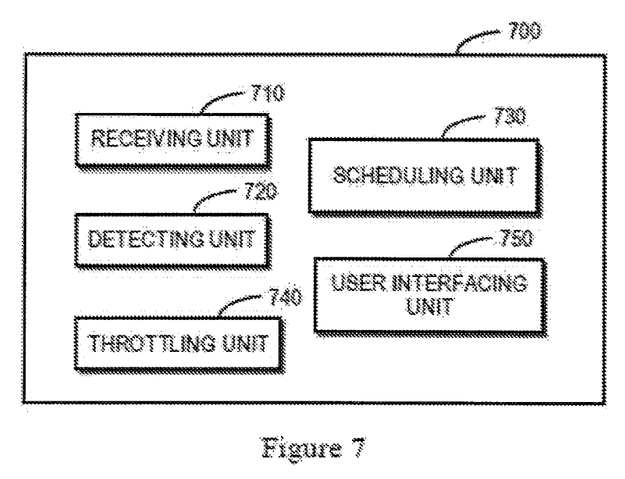
FIG. 7 illustrates a schematic diagram of an apparatus implemented in a virtual machine according to embodiments of the present disclosure.

FIG. 7 illustrates a block diagram of an apparatus 700 implemented in a virtual machine according to the embodiments of the present disclosure. As can be understood by those skilled in the art, FIG. 7 only illustrates units or components in apparatus 700 closely related to the present disclosure. In some embodiments, the apparatus 700 additionally includes other functional units or components that can enable its normal operation. Furthermore, the units or components shown in FIG. 7 may be in necessary connection relation which is, however, not depicted in FIG. 7 for conciseness. Moreover, in FIG. 7, optional units or components are represented by dashed box. In some embodiments, the apparatus 700 may be configured to implement the method 300 implemented in a virtual machine depicted above with reference to FIG. 3.

As shown in FIG. 7, the apparatus 700 comprises a receiving unit 710, a detecting unit 720 and a scheduling unit 730. The receiving unit 710 is configured to receive I/O requests for I/O operations on virtual disks of the virtual machine. The detecting unit 720 is configured to detect associations between the virtual disks and virtual storage devices of a virtual machine hypervisor for the virtual machine. The scheduling unit 730 is configured to schedule the I/O requests based on the associations.

In some embodiments, the receiving unit 710 may be further configured to: organize the I/O requests into a first I/O request queue associated with a respective one of the virtual disks; and merge the I/O requests based on the first I/O request queue.

In some embodiments, the detecting unit 720 may be further configured to: detect, among the virtual disks, virtual disks sharing a same virtual storage device.

In some embodiments, the scheduling unit 730 may be further configured to: organize, based on the associations, the I/O requests into a second I/O request queue associated with a respective one of the virtual storage devices; and sort the I/O requests in the second I/O request queue.

In some embodiments, the scheduling unit 730 may be further configured to: convert the sorted second I/O request queue as a third I/O request queue associated with corresponding one of the virtual disks; and send the third I/O request queue to the virtual machine hypervisor, so that the virtual machine hypervisor performs I/O operations corresponding to the I/O requests in the third I/O request queue in sequence.

In some embodiments, the scheduling unit 730 may sort the second I/O request queue based on at least one of the following: a feature of the second I/O request queue and a feature of the virtual disk associated with the I/O requests in the second I/O request queue.

In some embodiments, the feature of the second I/O request may comprises at least one of the following: a predetermined number of I/O requests to be processed in the second I/O request queue, an arriving time of the I/O requests in the second I/O request queue, a type of the I/O operations in the second I/O request queue, scheduling history statistics of the I/O operations in the second I/O request queue, and a priority of the I/O operations in the second I/O request queue. In some embodiments, the feature of the virtual disk may comprise at least one of the following: a priority of the virtual disk and scheduling history statistics of the virtual disk.

In some embodiments, apparatus 700 may further include a throttling unit 740 which can be configured to throttle the second I/O request queue. In some embodiments, the apparatus 700 may further comprise a user interface unit 750 from which a throttling threshold for throttling may be received. Furthermore, in response to the number of I/O requests in the second I/O request queue reaching the throttling threshold, the throttling unit 740 may throttle the second I/O request queue.

In some embodiments, the scheduling unit 730 may be further configured to: detect additional associations between the virtual disks and a backend storage device; and schedule the I/O requests based on the associations and the additional associations.

In some embodiments, the setting of the priority of each type of I/O operation and the I/O operation priority of each virtual disk may be received from the user interface unit 750; and the I/O operation performance of each type and the I/O operation on each virtual disk may be sent to the user interface unit 750 for a user to adjust the setting.

In some embodiments, in response to the detecting unit 720 detecting the associations, the virtual disk being attached to a NOOP I/O scheduler may be attached to the scheduling unit 730.

Compared with the various conventional approaches, the method and system implemented in the virtual machine according to the embodiments of the present disclosure at least achieve the following technical advantages. First of all, they possess higher universality. As the guest OS side method, it can be used on different virtual machine hypervisor platforms and different backend storage devices. Secondly, they provide more flexible and better user experience. As an intelligent detector can be aware of information of the virtual machine hypervisor at the underlying layer and the virtual storage device, the method and apparatus according to the embodiments of the present disclosure do not require rich experience and much effort from the user.

Furthermore, they are more efficient. Since they have the knowledge of the requirements of the application, they can achieve the targeting I/O QoS at the virtual machine layer. I/O scheduling of two ways are supported: scheduling based on I/O type and scheduling based on virtual disk queue. Lastly, they show better compatibility compared with the conventional IT solutions, and less efforts for moving the physical IT solutions to the virtual version are required. Without changing the interfaces with upper layer applications, they can work like a transparent task for the whole software stack and show better compatibility with the conventional IT solutions.

Figure 8:
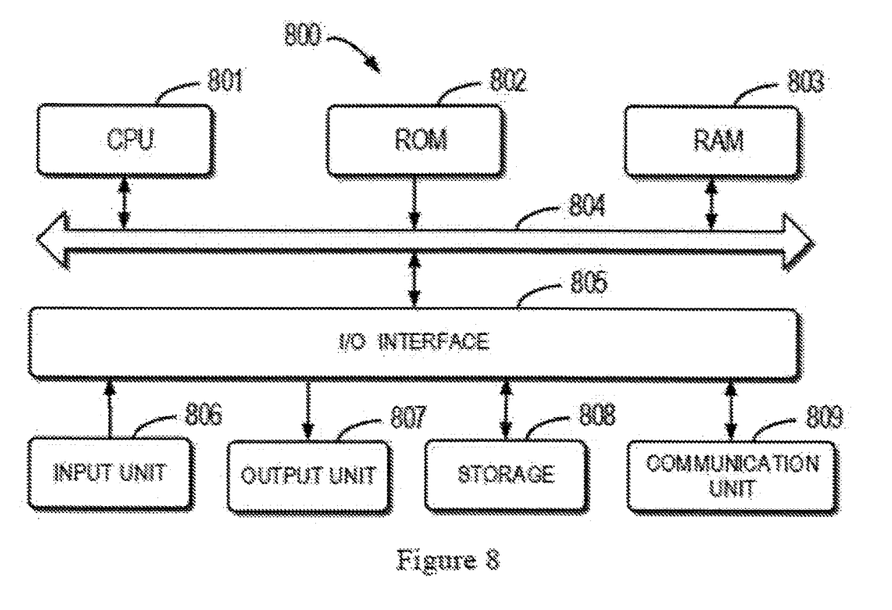
FIG. 8 schematically illustrates a schematic diagram of a device that can be used to implement embodiments of the present disclosure.

FIG. 8 schematically illustrates a block diagram of an apparatus 800 that may be used to implement the embodiments of the present disclosure. As shown in FIG. 8, the apparatus 800 comprises a Central Processing Unit (CPU) 801 which can perform various appropriate actions and processing based on computer program instructions stored in Read Only Memory (ROM) 802 or computer program instructions uploaded from storage unit 808 to the Random Access Memory (RAM) 803. In RAM 803, there further stores various programs and data needed by operations of the apparatus 800. CPU 801, ROM 802 and RAM 803 are connected one another via a bus 804. The input/output (I/O) interface 805 may also be connected to the bus 804.

A plurality of components in apparatus 800 are connected to the I/O interface 805, comprising: an input unit 806, such as a keyboard, a mouse, and the like; an output unit 807, such as display of various types and loudspeakers; a storage unit 808, such as a magnetic disk and an optical disk; a communication unit 809, such as a network card, a modem, a wireless communication transceiver and so on. A communication unit 809 allows the device 800 to exchange information/data with other devices via computer networks, such as Internet, and/or various telecommunication networks.

The processes and processing described above, the method 300 for instance, may be executed by a processing unit 801. For example, in some embodiments, the method 300 may be implemented as a computer software program which is corporeally contained in a machine readable medium, such as storage 808. In some embodiments, the computer program may be partly or wholly loaded and/or mounted on the device 800 by ROM 802 and/or the communication unit 809. When the computer program is uploaded to RAM 803 and executed by CPU 801, one or more steps of the method 300 described above may be executed.

To implement the targeting I/O QoS in the virtual environment, there is provided an optimized application-aware I/O scheduler in a guest OS. In particular, a detector may be used to collect information about which virtual disks share the same virtual storage device and report it to the I/O scheduler of the guest OS. Therefore, the I/O scheduler may schedule I/O of different virtual disks within the virtual storage device or backend storage device. The embodiments of the present disclosure support I/O scheduling policies of two types, both being very useful for the actual production environment. The embodiments of the present disclosure may implement application-aware I/O QoS effectively in a virtual environment. More importantly, they can help move IT solution of the virtual version to different virtual platforms, showing good flexibility and compatibility.

As used in the description of embodiments of the present disclosure, the term "includes" and its variants are to be read as open-ended terms that mean "includes, but is not limited to." The term "based on" is to be read as "based at least in part on." The term "one example embodiment" or "an example embodiment" is to be read as "at least one example embodiment."

It will be noted that the embodiments of the present disclosure can be implemented in software, hardware, or a combination thereof. The hardware part can be implemented by a special logic; the software part can be stored in a memory and executed by a suitable instruction execution system such as a microprocessor or a special purpose hardware. Ordinary skilled in the art may understand that the above method and system may be implemented with computer executable instructions and/or in processor-controlled code, for example, such code is provided on a programmable memory or a data bearer such as an optical or electronic signal bearer.

Further, although operations of the methods are described in a particular order in the drawings, it does not require or imply that these operations are necessarily performed according to this particular sequence, or a desired outcome can only be achieved by performing all shown operations. On the contrary, the execution order for the steps as depicted in the flowcharts may vary. Alternatively, or in addition, some steps may be omitted, a plurality of steps may be merged into one step, or a step may be divided into a plurality of steps. It should also be noted that the features and functions of the above described two or more units may be embodied in one unit. Also, the features and functions of the above described for one unit may be further embodied in more units.

Although the present disclosure has been described with reference to various embodiments, it should be understood that the present disclosure is not limited to the disclosed embodiments. The present disclosure is intended to cover various modifications and equivalent arrangements included in the spirit and scope of the appended claims.

We claim:

1. A method implemented in a virtual machine, comprising:
   receiving, from an application layer or file system, Input/Output (I/O) requests for I/O operations on virtual disks of the virtual machine;
   detecting associations between the virtual disks and virtual storage devices of a virtual machine hypervisor for the virtual machine, at least in part by detecting which ones of the virtual disks share one of the virtual storage devices, wherein detecting which ones of the virtual disks of the virtual machine share one of the virtual storage devices of the virtual machine hypervisor comprises detecting that at least two of the virtual disks of the virtual machine share one of the virtual storage devices of the virtual machine hypervisor; and
   scheduling the I/O requests based on the associations.

2. The method according to claim 1, wherein the receiving I/O requests for I/O operations on virtual disks of the virtual machine comprises:
   organizing the I/O requests into a first I/O request queue associated with a respective one of the virtual disks; and
   merging the I/O requests based on the first I/O request queue at least in part by making at least one of the I/O requests larger.

3. The method according to claim 1, wherein the scheduling the I/O requests based on the associations comprises:
   organizing, based on the associations, the I/O requests into a second I/O request queue associated with a respective one of the virtual storage devices; and
   sorting I/O requests in the second I/O request queue.

4. The method according to claim 3, further comprising:
   converting the sorted second I/O request queue as a third I/O request queue associated with a respective one of the virtual disks; and
   sending the third I/O request queue to the virtual machine hypervisor, so that the virtual machine hypervisor performs I/O operations corresponding to the I/O requests in the third I/O request queue in sequence.

5. The method according to claim 3, wherein the sorting I/O requests in the second I/O request queue comprises sorting based on at least one of the following:
   a feature of the second I/O request queue, and
   a feature of the virtual disk associated with the I/O requests in the second I/O request queue.

6. The method according to claim 5, wherein the feature of the second I/O request queue comprises at least one of the following:
   a predetermined number of I/O requests to be processed in the second I/O request queue,
   an arriving time of the I/O requests in the second I/O request queue,
   a type of the I/O operations in the second I/O request queue,
   scheduling history statistics of the I/O operations in the second I/O request queue, and
   a priority of the I/O operations in the second I/O request queue.

7. The method according to claim 5, wherein the feature of the virtual disk comprises at least one of the following:
   a priority of the virtual disk, and
   scheduling history statistics of the virtual disk.

8. The method according to claim 3, further comprising:
   throttling the second I/O request queue.

9. The method according to claim 8, wherein the throttling the second I/O request queue comprises:
   receiving a throttling threshold for the throttling from a user interface; and
   in response to the number of I/O requests in the second I/O request queue reaching the throttling threshold, throttling the second I/O request queue.

10. The method according to claim 1, wherein the scheduling the I/O requests further comprises:
    detecting additional associations between the virtual disks and a backend storage device; and
    scheduling the I/O requests based on the associations and the additional associations.

11. The method according to claim 1, further comprising:
    receiving a setting related to a priority of each type of I/O operation and a priority of an I/O operation on each virtual disk from a user interface; and
    informing performance of each type of I/O operation and the I/O operation on each virtual disk to the user interface for a user to adjust the setting.

12. The method according to claim 1, wherein the detecting is performed by a detecting unit and the scheduling is performed by a scheduling unit, the method further comprising:
    in response to the detecting unit detecting the associations, attaching a virtual disk being attached to a NO Operation (NOOP) I/O scheduler to the scheduling unit.

13. An apparatus implemented in a virtual machine, comprising:
    at least one processor;
    and at least one memory comprising computer program codes; wherein
    the at least one memory and the computer program codes are configured to, together with the processor, cause the apparatus to at least:
      receive, from an application layer or file system, Input/Output (I/O) requests for I/O operations on virtual disks of the virtual machine;
      detect associations between the virtual disks and virtual storage devices of a virtual machine hypervisor for the virtual machine, at least in part by detecting which ones of the virtual disks share one of the virtual storage devices, wherein detecting which ones of the virtual disks of the virtual machine share one of the virtual storage devices of the virtual machine hypervisor comprises detecting that at least two of the virtual disks of the virtual machine share one of the virtual storage devices of the virtual machine hypervisor; and
      schedule the I/O requests based on the associations.

14. The apparatus according to claim 13, wherein the at least one memory and the computer program codes are further configured to, together with the processor, cause the apparatus to receive I/O request for I/O operations on virtual disks of the virtual machine at least by:
 organizing the I/O requests into a first I/O request queue associated with corresponding one of the virtual disks; and
 merging the I/O requests based on the first I/O request queue at least in part by making at least one of the I/O requests larger.

15. The apparatus according to claim 13, wherein the at least one memory and the computer program codes are further configured to, together with the processor, cause the apparatus to schedule the I/O request based on the associations at least by:
 organizing, based on the associations, the I/O requests into a second I/O request queue associated with a respective one of the virtual storage devices; and
 sorting I/O requests in the second I/O request queue.

16. The apparatus according to claim 15, wherein the at least one memory and the computer program codes are further configured to, together with the processor, cause the apparatus to at least:
 convert the sorted second I/O request queue as a third I/O request queue associated with a respective one of the virtual disks; and
 send the third I/O request queue to the virtual machine hypervisor, so that the virtual machine hypervisor performs I/O operations corresponding to the I/O requests in the third I/O request queue in sequence.

17. The apparatus according to claim 15, wherein the at least one memory and the computer program codes are further configured to, together with the processor, cause the apparatus to sort the second I/O request queue based on at least one of the following:
 a feature of the second I/O request queue, and
 a feature of the virtual disk associated with the I/O requests in the second I/O request queue.

18. The apparatus according to claim 17, wherein the feature of the second I/O request comprises at least one of the following:
 a predetermined number of I/O requests to be processed in the second I/O request queue,
 an arriving time of the I/O requests in the second I/O request queue,
 a type of the I/O operations in the second I/O request queue,
 scheduling history statistics of the I/O operations in the second I/O request queue, and
 a priority of the I/O operations in the second I/O request queue.

19. The apparatus according to claim 18, wherein the feature of the virtual disk comprises at least one of the following:
 a priority of the virtual disk, and
 scheduling history statistics of the virtual disk.

20. The apparatus according to claim 15, wherein the at least one memory and the computer program codes are further configured to, together with the processor, cause the apparatus to at least:
 throttle the second I/O request queue.

* * * * *